US011758086B2

(12) United States Patent
Han et al.

(10) Patent No.: US 11,758,086 B2
(45) Date of Patent: *Sep. 12, 2023

(54) SCENE LAYOUTS IN VIDEO CONFERENCES

(71) Applicant: Zoom Video Communications, Inc., San Jose, CA (US)

(72) Inventors: Lin Han, Los Altos, CA (US); Wei Li, Cupertino, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/513,303

(22) Filed: Oct. 28, 2021

(65) Prior Publication Data

US 2022/0116553 A1 Apr. 14, 2022

Related U.S. Application Data

(63) Continuation of application No. 17/068,757, filed on Oct. 12, 2020, now Pat. No. 11,190,710.

(51) Int. Cl.
*H04N 7/15* (2006.01)
*H04N 5/272* (2006.01)
*H04L 65/1089* (2022.01)
*H04L 65/403* (2022.01)
*H04N 5/268* (2006.01)

(52) U.S. Cl.
CPC ......... *H04N 5/272* (2013.01); *H04L 65/1089* (2013.01); *H04L 65/403* (2013.01); *H04N 5/268* (2013.01); *H04N 7/15* (2013.01)

(58) Field of Classification Search
CPC ..... H04L 65/1089; H04L 65/403; H04N 7/15; H04N 5/272; H04N 7/147; H04N 5/268
USPC ............................................. 348/14.01–14.16
See application file for complete search history.

(56) References Cited

U.S. PATENT DOCUMENTS

| 11,082,661 B1 * | 8/2021 | Pollefeys ................. H04N 7/15 |
| 2006/0098086 A1 | 5/2006 | Chandra et al. |
| 2012/0062689 A1 | 3/2012 | Sai et al. |
| 2012/0086769 A1 | 4/2012 | Huber et al. |
| 2013/0222526 A1 | 8/2013 | Miyazawa et al. |
| 2013/0282820 A1 * | 10/2013 | Jabri ..................... H04M 3/567 |
| | | 709/204 |

(Continued)

OTHER PUBLICATIONS

U.S. Appl. No. 17/068,757, Non-Final Office Action, dated Mar. 4, 2021, 12 pages.

(Continued)

*Primary Examiner* — Melur Ramakrishnaiah
(74) *Attorney, Agent, or Firm* — Kilpatrick Townsend & Stockton LLP

(57) ABSTRACT

One example method for conducting a conference between conference participants includes obtaining a scene layout for the conference, the scene layout comprising a plurality of video areas that are each assigned to a respective display video stream from one of the conference participants, and the scene layout forming a common visual presentation for the conference; receiving video streams from one or more of the conference participants; and displaying the scene layout, wherein the video streams from the conference participants are displayed in their respective assigned video areas.

20 Claims, 13 Drawing Sheets

METHOD FOR OPERATING A SERVER APPARATUS

(56) References Cited

U.S. PATENT DOCUMENTS

| | | | |
|---|---|---|---|
| 2015/0334313 A1* | 11/2015 | Chougle | H04L 65/1083 |
| | | | 348/14.07 |
| 2016/0165184 A1* | 6/2016 | Aaron | H04L 12/1822 |
| | | | 348/14.08 |
| 2016/0295169 A1 | 10/2016 | Hiller et al. | |
| 2017/0003866 A1* | 1/2017 | Bennett | G06F 3/167 |
| 2019/0377586 A1 | 12/2019 | Faulkner et al. | |
| 2020/0104092 A1* | 4/2020 | Cohen | G06F 3/0482 |

OTHER PUBLICATIONS

U.S. Appl. No. 17/068,757 , Notice of Allowance, dated Jul. 19, 2021, 6 pages.

* cited by examiner

SCENE COMPONENTS

METHOD FOR OPERATING A
HOST APPARATUS

METHOD FOR OPERATING AN ATTENDEE APPARATUS

METHOD FOR OPERATING A
SERVER APPARATUS

SCENE LAYOUT EDITOR

METHOD FOR CREATING A
CUSTOM SCENE LAYOUT

SCENE LAYOUT
ZOOM LEVELS

SCENE LAYOUTS IN VIDEO CONFERENCES

CROSS-REFERENCE TO RELATED APPLICATIONS

This application is a continuation of U.S. patent application Ser. No. 17/068,757, filed Oct. 12, 2020, titled "Methods and System for Providing Scene Layouts During a Network Conference," the entirety of which is incorporated herein by reference.

FIELD

The exemplary embodiments of the present invention relate to the field of network communication. More specifically, the exemplary embodiments of the present invention relate to conducting a network conference.

BACKGROUND

With the increasing popularity of digital electronics and network communications, real-time interactive network conferences (or meetings) have become more popular. For example, network conferencing applications now allow people to communicate with each other from remote locations to exchange audio and video in real time.

During a network conference, each meeting attendee can transmit video and audio signals to other attendees. A typical conferencing system is configured with a camera that captures an image of a conference attendee and transmits this image to other attendees. Typically, attendee images are displayed on a non-descript background. However, network conferences are now being conducted for all types of events, such as holiday parties, weddings, and other types of events. Thus, it is desirable to have a mechanism to customize how images of the conference attendees are displayed to add context to the meeting and enhance user experience.

SUMMARY

In various embodiments, system and methods are disclosed for providing scene layouts during a network conference. In an embodiment, a host of a network conference identifies a customizable scene layout to be used to conduct the network conference. For example, the host selects the scene layout from layouts available at a conference server. The scene is distributed to the conference attendees. In an embodiment, the host passes a universal resource locator (URL) to the conference attendees that identifies a location from which the scene can be downloaded. The scene comprises customizable background layers, foreground layers, and video layers as well as other features. The video layers include video areas or regions, such as video boxes. The host assigned the video boxes to the conference attendees. During the conference, each participant displays the scene and each video box of the scene displays an image or live video stream of an attendee assigned to that box. Thus, the scene operates to add context to the meeting and enhance user experience.

The host can customize the scene by modifying various aspects of the scene. For example, the host can modify the background, foreground, or video regions. The modifications of the scene by the host are propagated to the attendees. In an embodiment, an attendee can send a request to the host to modify the attendee's video region. For example, the attendee can request to changes the size, shape, location, orientation, features, and/or background of the attendee's video region. The host can authorize or decline the requested changes.

In an embodiment, the scene also includes video effects, reactions, accessories images, text areas, and accessory selectors. For example, the video effects can include effects that are applied to the video image of an attendee. The effects can be fixed within the video region of the attendee or pinned to allow the effect to move with the image of the attendee.

In an embodiment, a method for providing a scene layout for use by conference participants during a network conference is disclosed. The method includes identifying a conference host and conference attendees from the conference participants, identifying a scene layout selected by the conference host, and distributing the scene layout to the conference participants. The scene layout includes a plurality of video areas. The method also includes assigning selected video areas of the scene layout to selected conference participants, respectively, receiving video streams from the selected conference participants, and displaying the scene layout so that the video streams from the selected conference participants are displayed in their associated video areas, respectively.

In an embodiment, a host apparatus is provided for conducting a network conference with conference participants that include the host apparatus and one or more attendee user equipment (UE). The host apparatus comprises a transceiver to communicate with the one or more attendee UE. The host apparatus also comprises a processor that performs functions that include identifying a scene layout that comprises a plurality of video areas, distributing the scene layout to the one or more attendee UE, and assigning selected video areas of the scene layout to selected conference participants, respectively. The processor also performs functions that include receiving video streams from the selected conference participants, and displaying the scene layout so that the video streams from the selected conference participants are displayed in their assigned video areas, respectively.

In an embodiment, a non-transitory computer readable medium is provided on which are stored program instructions that, when executed by one or more processors, cause the one or more processors to conduct a network conference with conference participants that include a host apparatus and one or more attendee user equipment (UE) by performing operations of: identifying a scene layout that comprises a plurality of video areas; distributing the scene layout to the one or more attendee UE; assigning selected video areas of the scene layout to selected conference participants, respectively; receiving video streams from the selected conference participants; and displaying the scene layout so that the video streams from the selected conference participants are displayed in their assigned video areas, respectively.

Additional features and benefits of the exemplary embodiments of the present invention will become apparent from the detailed description, figures and claims set forth below.

BRIEF DESCRIPTION OF THE DRAWINGS

The exemplary embodiments of the present invention will be understood more fully from the detailed description given below and from the accompanying drawings of various embodiments of the invention, which, however, should not be taken to limit the invention to the specific embodiments, but are for explanation and understanding only. This patent or application file contains at least one drawing executed in color. Copies of this patent or patent application publication with color drawing(s) will be provided by the Office upon request and payment of the necessary fee.

DETAILED DESCRIPTION

Figure 1:
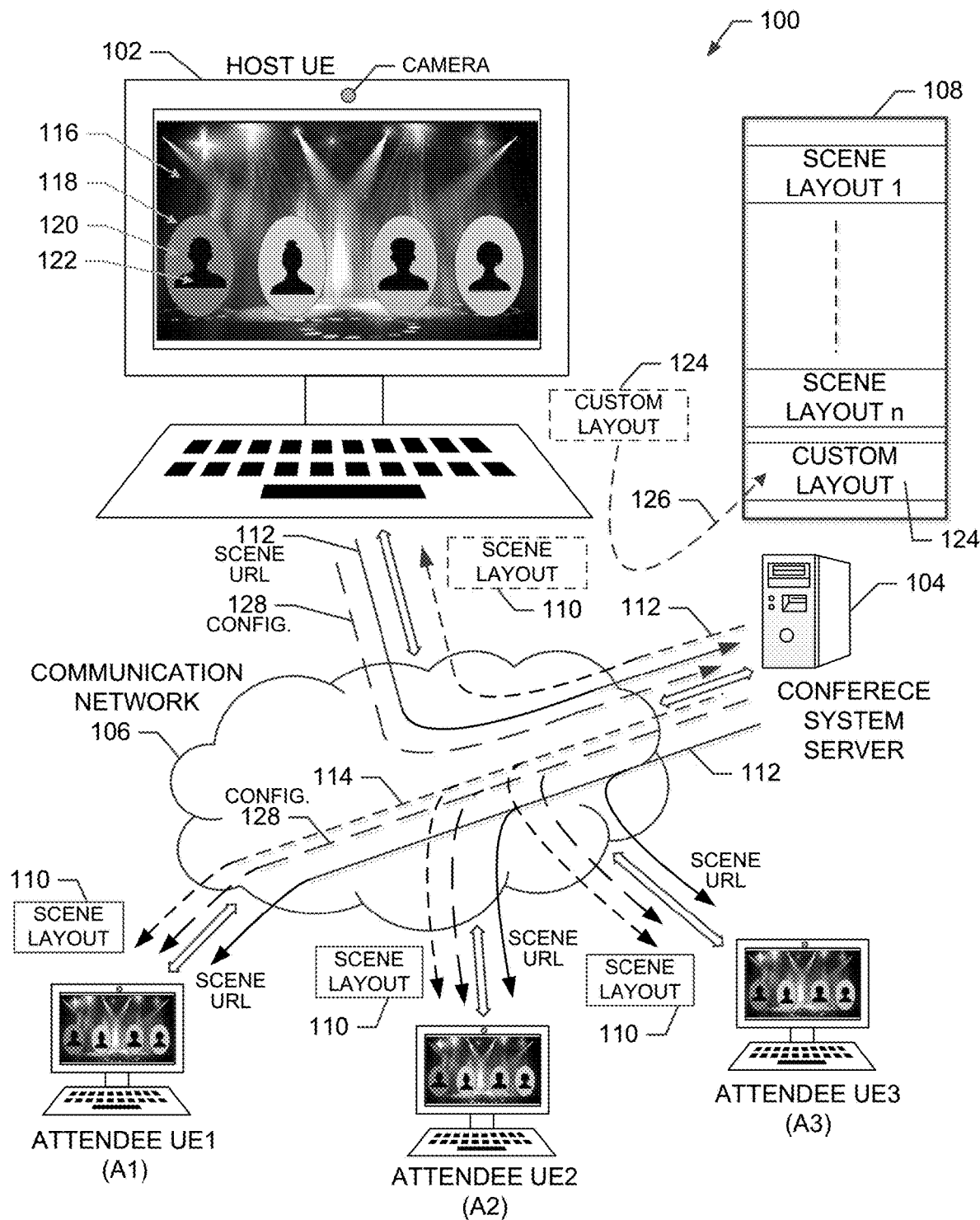
FIG. 1 shows a diagram illustrating a communication network configured to conduct a network conference with a configurable scene layout.

Embodiments of the present invention disclose systems, methods, and apparatus for providing scene layouts during a network conference. The scene layouts are selected by a conference host and are customizable by the host. Conference attendees can also modify certain aspects of the scene layout with authorization from the host. Scenes can be selected from pre-stored templates or can be designed by the conference host to add context to the meeting and enhance user experience.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application and business related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiments of present invention, the components, process steps, and/or data structures described herein may be implemented using various types of operating systems, computing platforms, computer programs, and/or general-purpose machines. In addition, those of ordinary skills in the art will recognize that devices of a less general-purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine or computer for execution. The instructions may be stored on a tangible medium such as a computer memory device, such as, but not limited to, magnetoresistive random access memory ("MRAM"), phase-change memory, or ferroelectric RAM ("FeRAM"), flash memory, ROM (Read Only Memory), PROM (Programmable Read Only Memory), EEPROM (Electrically Erasable Programmable Read Only Memory), Jump Drive, magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, subsystems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

FIG. 1 shows a diagram illustrating a communication network 100 configured to conduct a network conference with a configurable scene layout. The communication network 100 comprises first user equipment 102, which is referred to as a host UE that acts as a host for the network conference. The network 100 also comprises attendee user equipment (A1-A3) that participant in the network conference. The conference participants (e.g., host 102 and attendees (A1-A3)) are configured to communicate with each other utilizing a conference system server 104 and communication network 106. In an embodiment, the conference server 104 stores a plurality of scene layouts 108 that can be purchased or licensed for use during a network conference. In another embodiment, the host can create a custom layout 124 that is sent to the server 104 (indicated at 126) when the conference is initially setup. The custom layout 124 is stored at the sever 104 and made available to the attendees in the same way as the pre-defined layouts. An editor for creating customized layouts is discussed in greater detail below. In an embodiment, the communication network 106 comprises a wired communication network, a wireless communication network, or a combination of wired and wireless communication networks.

During a conference, the host 102 communicates with the conference server 104 to obtain a scene layout for use during the network conference. For example, the host obtains the scene layout 110 that is transmitted from the conference server 104 to the host UE 102 over network path 112.

An exemplary depiction of the scene layout 110 is shown on the display of the host 102. The scene layout 110 comprises a plurality of visual components that include a scene background 116 and video boxes or regions 118 in which video streams from the participants are displayed. For example, an attendee video stream comprises an attendee background 120 and an image 122 of the attendee. A more detailed description of the various scene components is provided below.

To distribute the scene 110 to the attendees, the host 102 transmits a universal resource locator (URL) 112 associated with the scene to the attendees (A1-A3). For example, the URL is provided to the host UE with the scene layout 110. Each attendee uses the URL 112 to obtain the scene layout 110 from the conference server 104. The host 102 retains control over the scene layout 110 and can make adjustments or changes to the scene layout, and these changes are propagated to the scene layouts displayed on the UE of the attendees. For example, the host UE generates and outputs configuration parameters 128 that are distributed to the attendees. The configuration parameters 128 assign the attendees' video stream to selected video regions within the scene. The configuration parameters 128 also control various other aspects of the scene. The attendees also are allowed to change characteristics related to the presentations of their own video streams with permission from the host. For example, with permission from the host UE 102, an attendee can transmit its own set of configuration parameters that adjust the regions of the layout associated with the attendee, for instance, the attendees' video region within the scene layout. Thus, the scene layout 110 forms a common visual presentation for the network conference that adds context to the meeting and enhances user experience.

In various exemplary embodiments, scene layouts are provided for use during network conferences by performing at least the following operations.

1. A host UE obtains a scene layout to be used for a network conference. In an embodiment, the host UE obtains the scene layout from a conference server. In another embodiment, a custom scene layout is created on the host UE and passed to the network server for distribution to conference attendees.

2. The scene layout is distributed to the conference attendees. For example, in an embodiment, the host sends to the attendees, a URL that identifies the network location of the scene layout.

3. The attendees obtain the scene layout and display this layout on their own UE during the conference. The scene layout includes video boxes or regions that are assigned to display the video streams from the host and the conference attendees. For example, the host UE generates and transmits configuration parameters 128 that assign the video regions in the scene layout to the attendee video streams. Thus, the scene layout forms a common visual presentation for the network conference.

4. Changes to the scene can be made by the host or by an attendee with the host's permission. For example, the host can generate and transmit configuration parameters 128 to adjust the sizes or locations of the video regions within the scene. An attendee can obtain permission from the host to generate and send out its own configuration parameters to adjust the size of its own video box or to add video effects or backgrounds to the attendee's image.

Thus, all of the participants of the conference see the same scene layout with the attendees in the same screen locations and having the same video characteristics. More detailed descriptions of the various implementations and operations host 102, attendees (A1-A3) and conference server 104 to provide scene layouts during a network conference are provided below.

Figure 2:
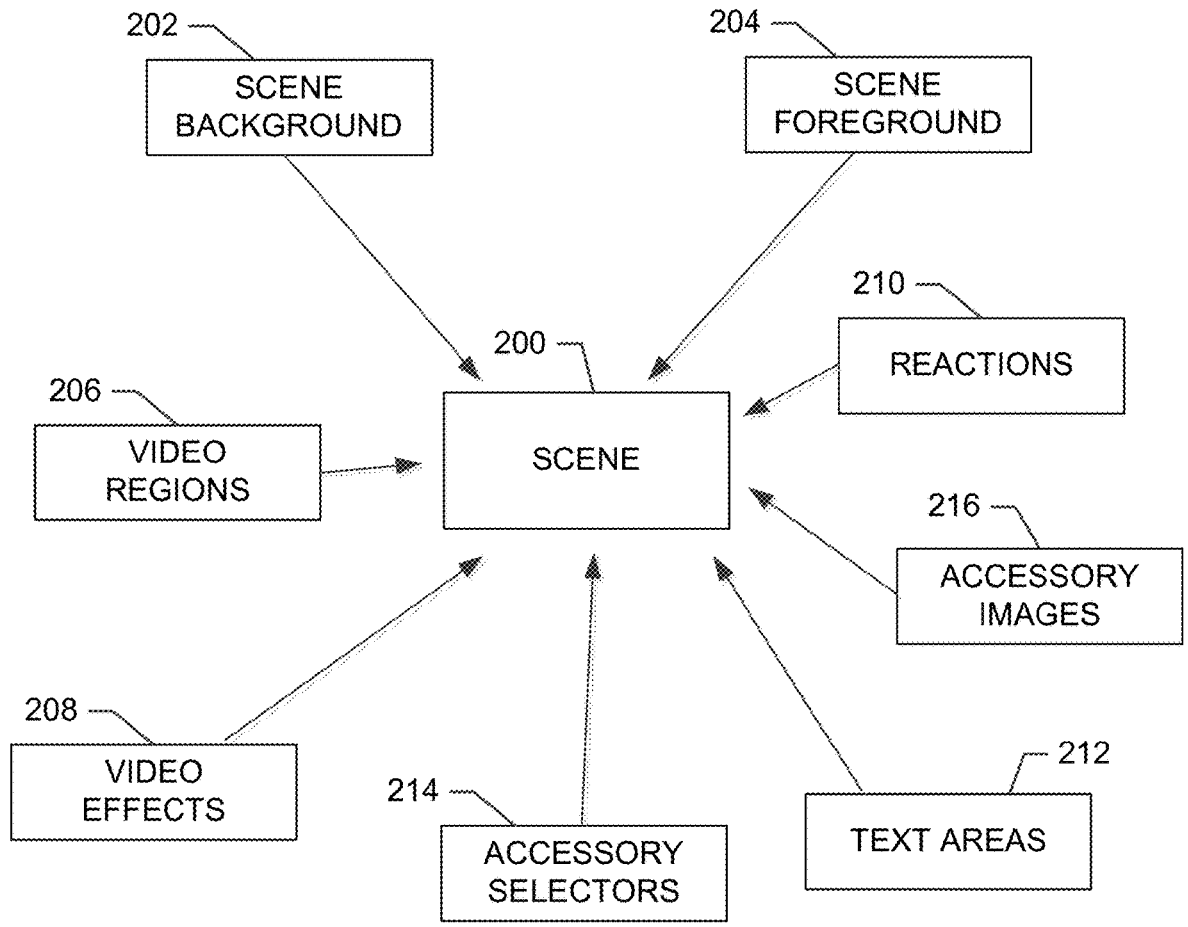
FIG. 2 shows an exemplary detailed embodiment of a scene layout that comprises a plurality of scene components in accordance with various exemplary embodiments.

FIG. 2 shows an exemplary detailed embodiment of a scene layout 200 that comprises a plurality of scene components in accordance with various exemplary embodiments. For example the scene layout 200 is suitable for use as the scene layout 110 shown in FIG. 1. In various exemplary embodiments, the scene layout 200 comprises one or more of the following scene components.

Scene Background—The scene layout 200 comprises a scene background 202. The scene background comprises images, pictures, fill patterns, designs, or other background information that is generated using one or more background layers.

Scene Foreground—The scene layout 200 comprises a scene foreground 204. The scene foreground 204 comprises images, pictures, fill patterns, designs, or other foreground information that is generated using one or more foreground layers.

Video Regions—The scene layout 200 also comprises video regions 206. The video regions are assigned to the conference participants (host and attendees) to provide at least one video region for each participant to the conference. Video regions are generated using one or more video layers and each video region has an identifier, such as an ID number or screen location, which identifies that video region to all conference participants. In an embodiment, these identifiers are used to assign video regions to the video streams of the conference participants.

Video Effects—The scene layout 200 also comprises video effects 208 that can be added to the video regions. For example, a video effect can be fixed at a specification location in a video background or pinned to a video image of an attendee.

Reactions—The scene layout 200 also comprises reactions 210. The reactions 210 are provided by selectable icons or emoji that allow a participant to express a visual reaction during the conference. For example the reactions may be icons or images of clapping, cheering, thumbs up, or other user reactions.

Text Areas—The scene layout 200 also comprises text areas 212. The text areas 212 have various sizes and shapes and can be placed within the scene. The text areas allow text information to be displayed and exchanged between participants of the video conference.

Accessory Selectors—The scene layout 200 also comprises accessory selectors 214. The accessory selectors 214 are buttons are other selectors placed within the scene layout to allow participants to select various accessory functions.

Accessory Images—The scene layout 200 also comprises accessory images 216. The accessory images 216 are video images that can be applied to the face and head area of a participant, such as hats, mustache, Micky Mouse ears, etc.

More detail descriptions of the scene components and their implementation are provided in greater detail below.

Figure 3:
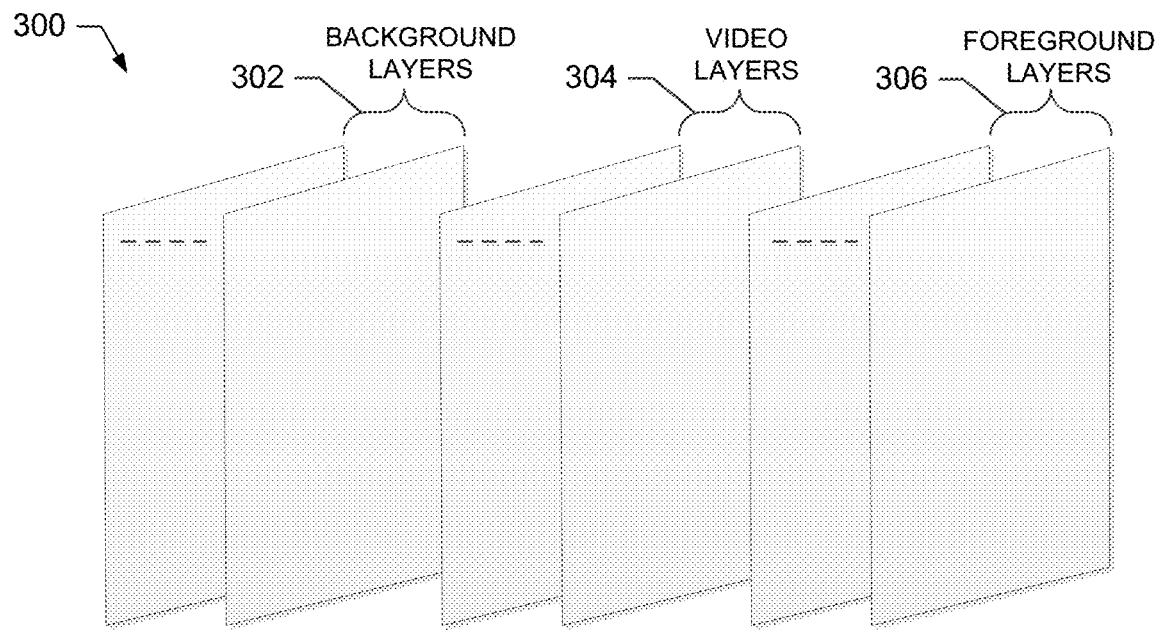
FIG. 3 shows an exemplary detailed embodiment of scene components that are used to construct a scene in accordance with various exemplary embodiments.
Figure 3:
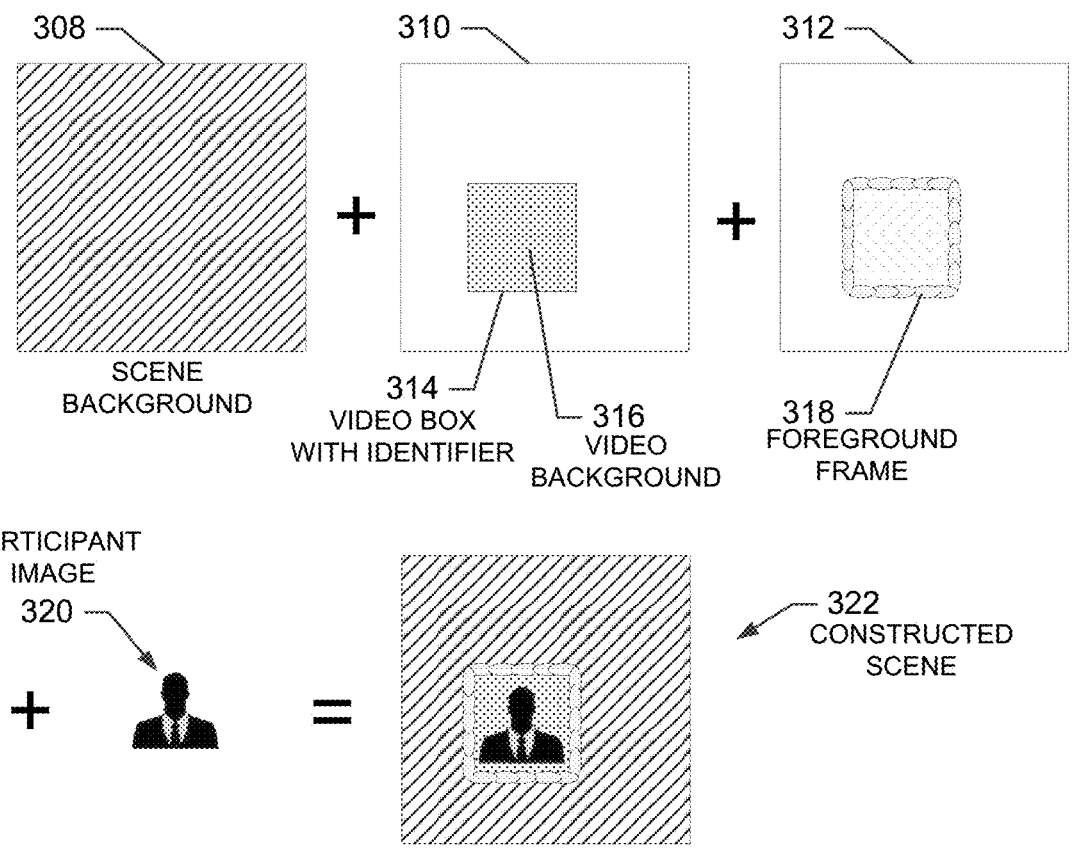

FIG. 3 shows an exemplary detailed embodiment of scene components 300 that are used to construct a scene in accordance with various exemplary embodiments.

In an embodiment the scene construction begins with one or more background layers 302. The one or more background layers can be used to incorporate various images, pictures, fill regions, decorations, or any type of visual images that can be placed on the background layers. Unused portions of the background layers can be transparent so that images on various layers will show through when the layers are assembled into a set.

The scene construction also includes video layers 304 that are used contain various video areas, regions, or boxes in which participant video streams will be placed. Each video region includes an identifier that can be used to identify the region when assigning the region to a video stream of a conference participant.

The scene construction also comprises one or more foreground layers 306 that can be used to incorporate various images, pictures, fill regions, decorations, or any type of visual images. Unused portions of the foreground layers can be transparent so that images on various layers will show through when the layers are assembled into a set. The foreground layers can be used to provide borders, frames, or any other visual decoration in order to construct a foreground image. For example, the foreground layers 306 can form borders or frames that form an overlay to the video regions.

In an embodiment, the scene is constructed by combining a scene background 308 formed by the background layers 302, a video region 310 formed by the video layers 304, and a scene foreground 312 formed by the foreground layers 306. The video region 310 include video boxes for the participant image streams. For example, the video region 310 includes video box 314 that has an identifier that is used to assign that region to a participant video stream. In addition each video box may include a video background 316 that is received from the participant or provided by the scene layout.

The scene foreground 312 can include various decorations, such as a foreground frame 318. The scene background 308, video region 310, and scene foreground 312 are combined with a participant image 320 to generate a constructed scene 322. As illustrated in the constructed scene 322, the participant image or video stream 320 is placed in the video box 314 and foreground frame 318 forms a frame around the video box 314. The video region 310 and scene foreground 312 are placed on top of the scene background 308.

Figure 4A:
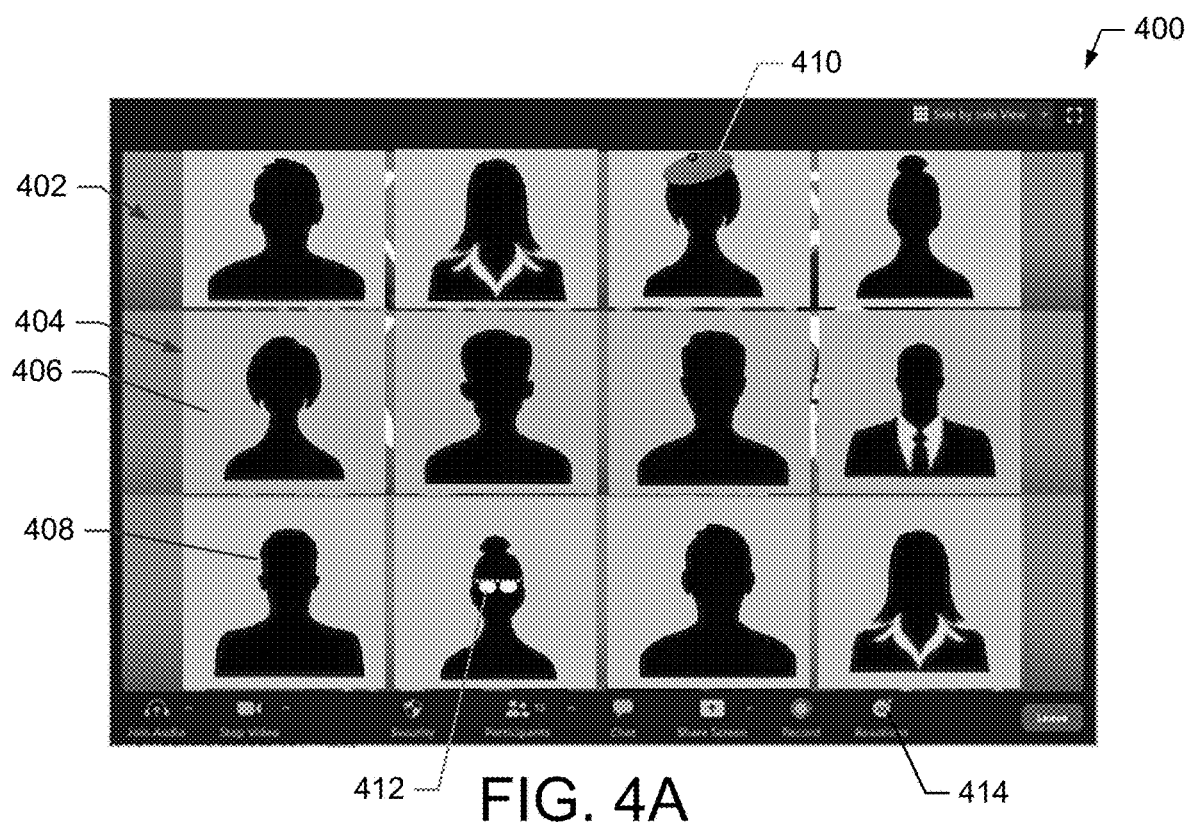
FIGS. 4A-B shows scene layouts constructed in accordance with various exemplary embodiments.

FIG. 4A shows an exemplary scene layout 400 constructed in accordance with various exemplary embodiments. The layout 400 comprises a scene background 402 and video boxes or regions, for example video region 404. Each video region comprises a video background, such as video background 406. Within each video box is a video stream of a participant to the conference. For example, the video stream 408 shows a conference participate. The scene layout 400 also comprised video effects, for example, the video effect 410 is a red beret hat, and the effect 412 are red glasses. These video effects are added to the video images of the participants. The scene 400 also comprises a reactions button 414, which can be used by participants to add reactions to the video conference.

Figure 4B:
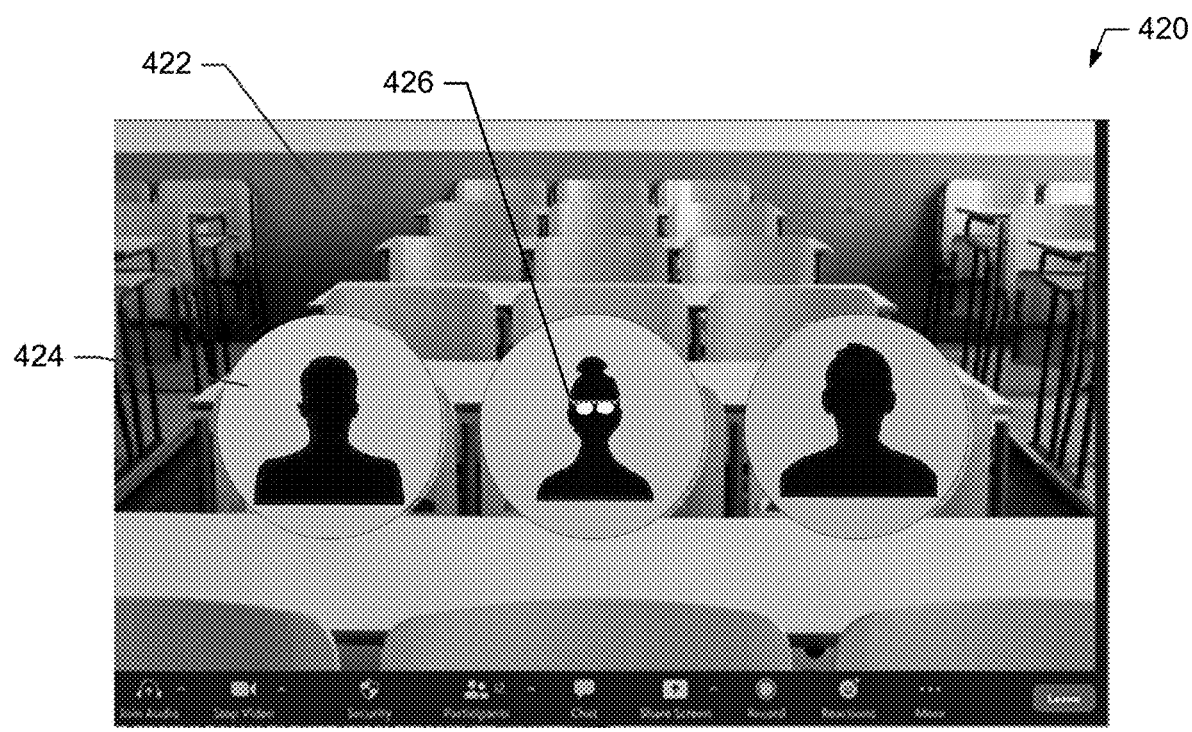

FIG. 4B shows an exemplary scene layout 420 constructed in accordance with various exemplary embodiments. The scene layout 420 comprises background 422, which depicts a classroom image. The classroom image comprises rows of seating and in the seating are video regions (e.g., region 424), which contain the video streams from conference participants. The scene 420 also comprises video effects. For example, colored glasses 426 are added to one of the participant images as an accessory image 216 or video effect 208.

Figure 5:
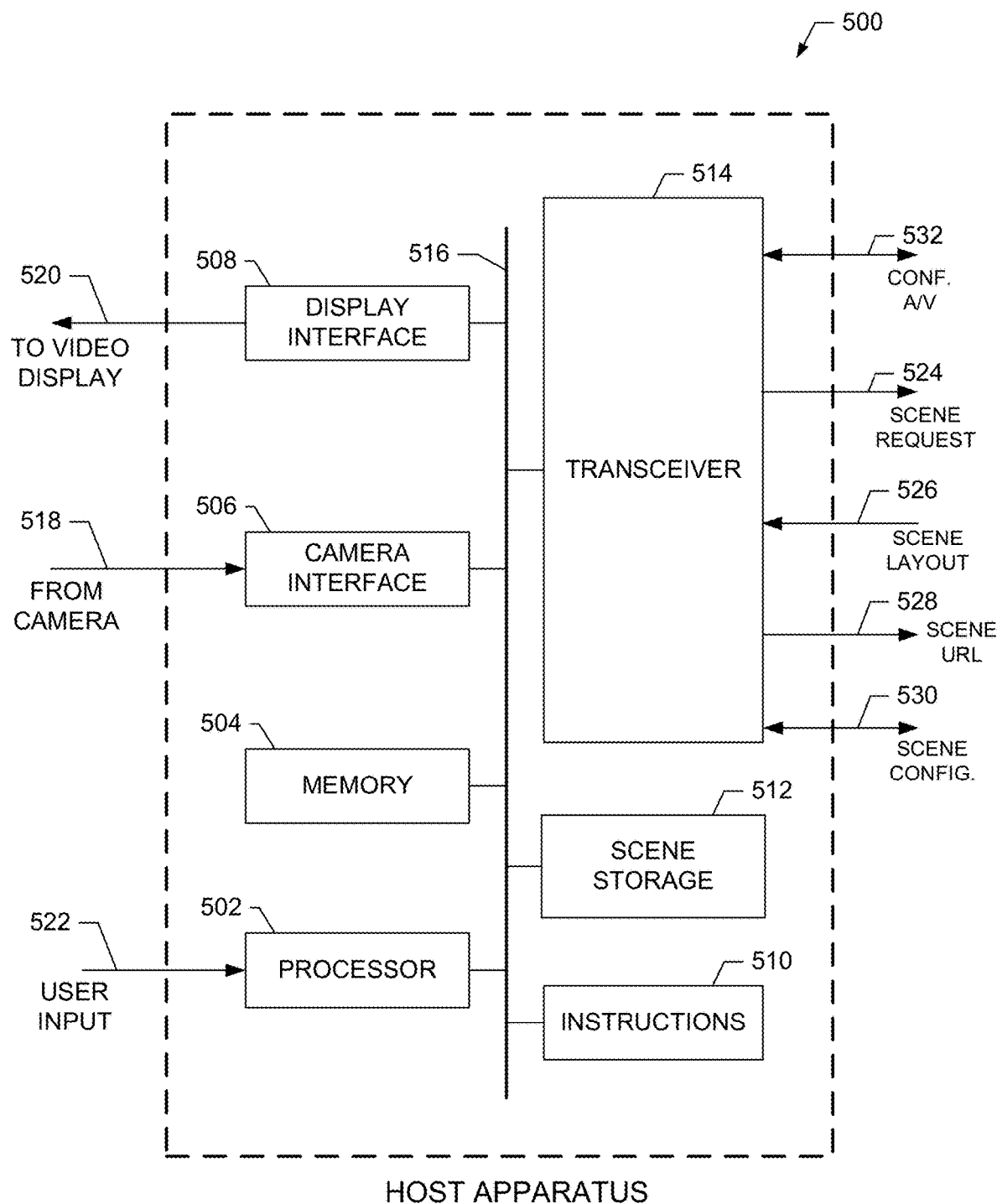
FIG. 5 shows an exemplary host apparatus configured to provide a scene layout during a network conference.

FIG. 5 shows an exemplary host apparatus 500 configured to provide a scene layout during a network conference. For example, the host apparatus 500 is suitable for use as the host UE 102 shown in FIG. 1. The host apparatus 500 comprises processor 502, memory 504, camera interface 506, display interface 508, instructions 510, scene storage 512, and transceiver 514 all connected to communicate over data bus 516.

During operation, the processor 502 executes the instructions 510 to perform the functions and operations of the host apparatus. For example, the processor 502 controls the camera interface 506 to receive a video signal 518 from a camera mounted at the user equipment. The video signal contains an image of the host user. The display interface 508 is configured to output display information 520 to a video display that is part of the host apparatus.

The processor 502 also receives user input 522 and uses this input to perform various functions of the apparatus. The transceiver 514 is used by the processor 502 to transmit and receive information during the network conference. For example, the processor 502 uses the transceiver 514 to transmit a scene request 524 to the conference server to request a particular scene layout for use during a video conference. For example, the scene request 524 is transmitted to the server 104 shown in FIG. 1. The server responds by sending the requested scene layout 526, which is received by the transceiver 514 and stored in scene storage 512. In an embodiment, the scene layout 526 is sent with a URL that identifies a location of the scene.

The processor 520 then uses the transceiver 514 to sends out the scene URL 528 to the conference attendees. Each attendee uses the URL to retrieve the scene layout 526 and display the scene layout on their respective user equipment. The processor 522 can make various adjustments and modifications to the scene as well assign the attendees to video regions that are configured within the scene.

Once the processor 502 completes any modifications or customizations of the scene, the processor outputs scene configuration information 530 to the attendees to allow those modifications to be reflected in the scenes displayed at the user equipment. In addition, the configuration information 530 includes assignments that assign participants to video regions within the scene. For example, each video region includes an identifier and the processor 502 assigns conference participant to the video regions using the region identifiers. The processor 502 also communicates with attendees using the configuration parameters 530. For example, the processor 502 can use the parameters 530 to grant permission to an attendee to modify its video region.

During the conference, the host apparatus exchanges audio/video (A/V) signals 532 with the conference attendees. The video signals received from the attendees are placed in the associated video regions of the scene, as demonstrated above. For example, the display interface 508 displays the scene layout with the participant videos included in the appropriate video regions. The camera interface 506 receives a host image signal 518 from a host camera and this host image is also placed in an host video region of the scene layout and displayed using the display interface 508.

In various exemplary embodiments, the processor 502 executes the instructions 510 to perform the functions and operations of the host apparatus 500. In an exemplary embodiment, the host apparatus 500 performs at least the following operations to provide a scene layout for use in a network conference.

1. The processor transmits a scene request 524 to a network server to obtain a selected scene layout.

2. The network server transmits the selected scene layout 526 to the host apparatus where it is received by the transceiver 514 and stored in the scene storage 512. The scene layout 526 includes an associated URL. In an alternative embodiment, a customized scene layout is generated by the host apparatus and transmitted to the server. The same process is used to retrieve the customized scene layout and associated URL as with the pre-defined layouts.

3. The processor 502 transmits the URL of the scene 528 to the conference attendees so that each attendee can retrieve the selected scene layout.

4. Processor retrieves the scene layout from storage 512 and outputs the scene to a video display using the display interface 508.

5. The processor 502 makes scene customizations to adjust scene components, such as background images, foreground images, or video regions within the scene layout. The processor also assigns video regions in the scene layout to conference participants. For example, each video region includes an identifier that is linked to a video stream of a particular conference participant.

6. The processor 502 propagates the scene changes and video region assignments to the conference attendees using scene configuration parameters 530. The attendees receive these parameters and update the scenes on their systems so that all the scene layouts match.

7. The video conference is conducted using the scene layout and images received from the attendees are displayed in the appropriate video regions within the scene.

8. Each attendee system also receives audio/video signals from all other attendees and the host, and displays the video images within the appropriate video regions of the scene layout.

9. Individual attendees can request modifications to their video image by sending a request to the host apparatus. The modifications can include changing the size and location of the video region for that attendee or the addition of special video effects to the video image of the attendee. For example, attendee requests are received as part of the configuration parameters 530.

10. The processor 502 either accepts or rejects the attendee request to modify its video image. For example, a host user reviews the request and provides user input 522 to the processor 502 indicating a decision on the request. If the changes are accepted, those changes are made within the scene and are also propagated to the other attendee systems using the configuration parameters 530. In another embodiment, the processor 502 transmits an authorization to the requesting attendee, which authorizes the attendee to send out its own configuration parameters that includes the adjustments to its own video region.

Figure 6:
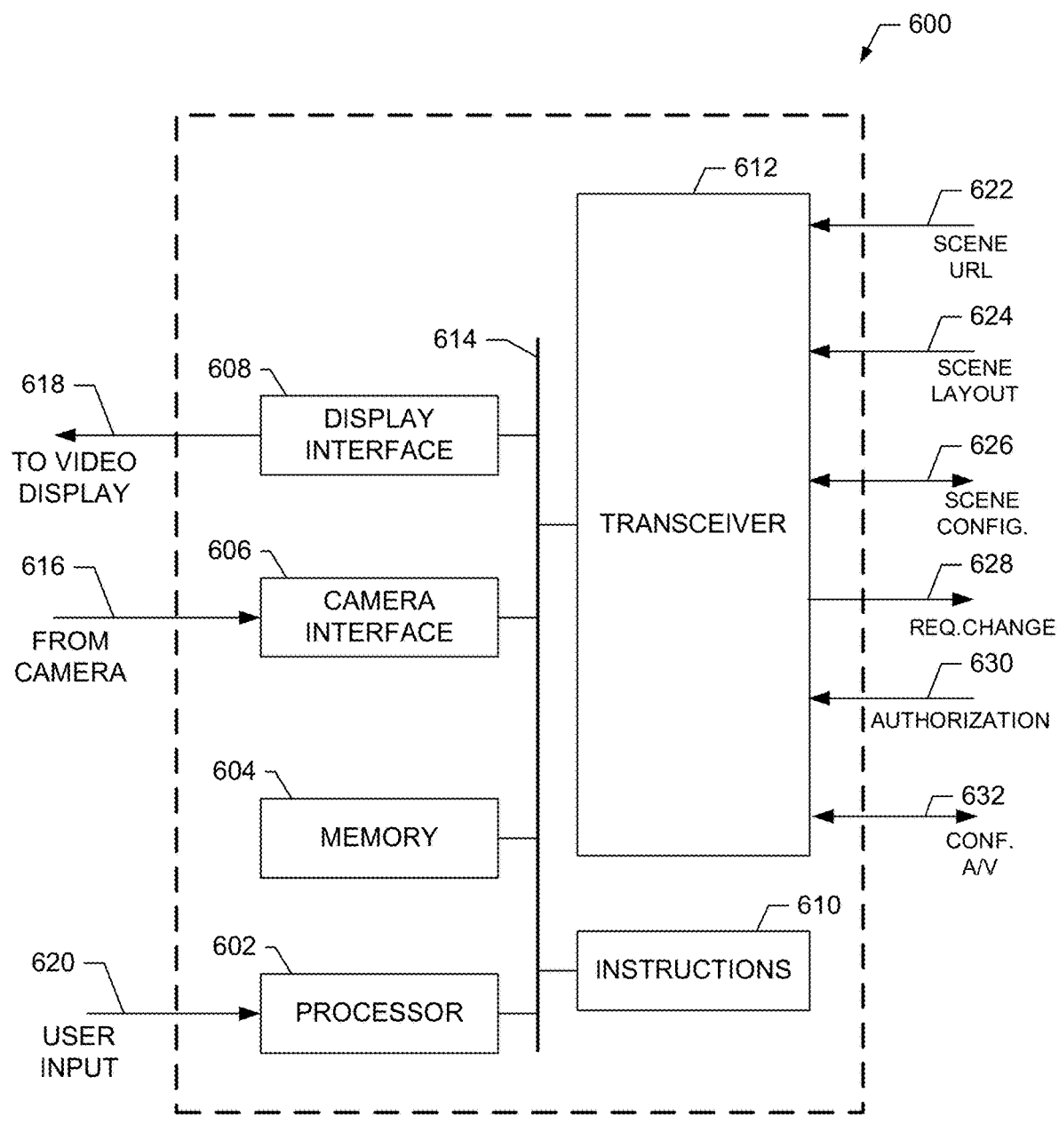
FIG. 6 shows an exemplary detailed embodiment of an attendee apparatus configured to receive and utilize a scene layout during a network conference.

FIG. 6 shows an exemplary detailed embodiment of an attendee apparatus 600 configured to receive and utilize a scene layout during a network conference. The attendee apparatus 600 is suitable for use as any of the attendee apparatus (A1-A3) shown in FIG. 1. In an embodiment, the attendee apparatus 600 comprises processor 602, memory 604, camera interface 606, display interface 608, instructions 610 stored in an instruction memory, and transceiver 612 all connected to communicate over bus 614. During operation the processor 602 executes instructions 610 and utilizes the memory 604 as necessary to perform the functions of the attendee apparatus describe herein.

The processor 602 communicates with a conference server using the transceiver 612 to establish a connection to join a video conference. A scene URL 622 is received from the conference host by the transceiver 612 and passed to the processor 602. The processor 602 utilizes this URL to request a scene from the network server. A scene layout 624 downloaded and stored in the memory 604. Scene layout includes video regions or boxes in which attendee video streams are displayed. For example, conference audio and video signals 632 are received by the transceiver 612.

The attendee apparatus comprises a camera from which camera signal 616 is processes by camera interface 606. A display interface 608 operates to output a video stream 618 to a video display at the attendee apparatus. The processor 602 obtains the scene layout from memory 604 and passes it to the display interface 608 for display on the video display. The processor 602 also obtains the video image 616 from the camera interface 606 and also passes this image to the display interface 608 for display within the appropriate video region the scene layout.

In an embodiment the processor 602 receives user input 622 and processes this input to generate a request 628 to change the attendee's video image in the scene layout. For example the user may request that the video box be changed in size or location or that the image includes some additional video features. The processor 602 uses the transceiver 612 to transmit the video request 628 to the host apparatus. The host apparatus responds with a decision 630 that either rejects or authorizes the requested change. The processor 602 makes any authorized changes within the scene layout and propagates these changes through the configuration parameters 626. In an embodiment, the communications with the host are processed by the host as part of the configuration parameters 530.

Figure 7:
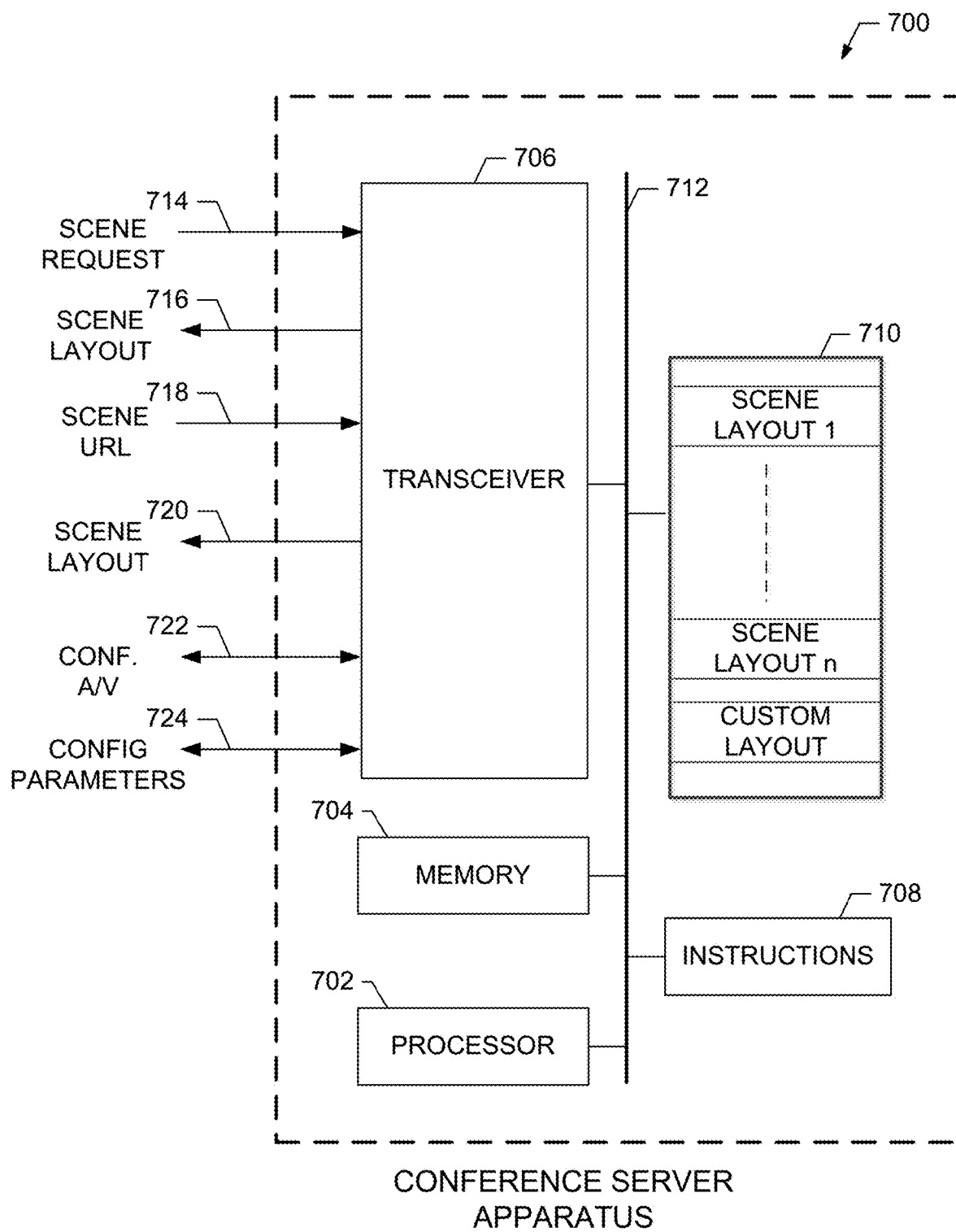
FIG. 7 shows an exemplary detailed embodiment of a server apparatus configured to provide scene layouts for use during a network conference.

FIG. 7 shows an exemplary detailed embodiment of a server apparatus 700 configured to provide scene layouts for use during a network conference. For example, the server apparatus 700 is suitable for use as the server 104 shown in FIG. 1. In an embodiment, the server 700 comprises processor 702, memory 704, transceiver 706, instructions 708, and scene layout storage 710 all couple to communicate over bus 712. The scene layout storage 710 comprises a plurality of pre-defined scene layouts and custom layouts. During operation, the processor 702 executes instructions 708 and utilizes the memory 704 as necessary to perform the functions of the server 700 as described herein.

During a network conference, the transceiver 706 communicates with the network 106 to exchange information between the conference host and attendees. For example, audio/video information 722 is exchanged between the conference participants. The transceiver 706 receives a scene request 714 from the conference host. The scene request identifies a particular scene layout in scene storage 710. The processor 702 obtains the identified scene layout and transmits the scene layout 716 along with an associated URL to the conference host. In an embodiment, the scene layout 716 includes a URL that identifies a location or addresses the scene layout. The host apparatus transmits the URL to attendees of the conference. Each attendee uses the URL 718 to access the identified scene layout 720. For example, the scene layout 720 is transmitted to each of the attendees for use during the network conference.

In an embodiment, the server 700 also communicates conference audio and video information 722 between the conference participants. The server 700 also communicates configuration parameters 724 between the conference participants.

Therefore, in various exemplary embodiments, the server apparatus 700 is configured to store pre-defined scene layouts and provide those layouts to participants of a network conference.

Distribution of Participant Video Information

In various exemplary embodiments, participant video streams are distributed to all participants of the conference. Video streams that are received at any particular participant are identified and displayed in the scene within the video region assigned to those video streams. In an embodiment, each participant video stream comprises a participant video background and a participant image. In another embodiment, each participant video stream comprises two streams. The first stream is a participant video background stream and the second stream is a participant image stream. In another embodiment, the participant background stream is transmitted as a "green" screen to facilitate replacement by a video background provided by the selected scene layout. Thus, there are various ways in which participant video streams can be transmitted, received, and processed and all are within the scope of the embodiments to allow the participant video streams to be displayed within the assigned video regions of the selected scene layout and to be displayed with a selected video background.

Figure 8:
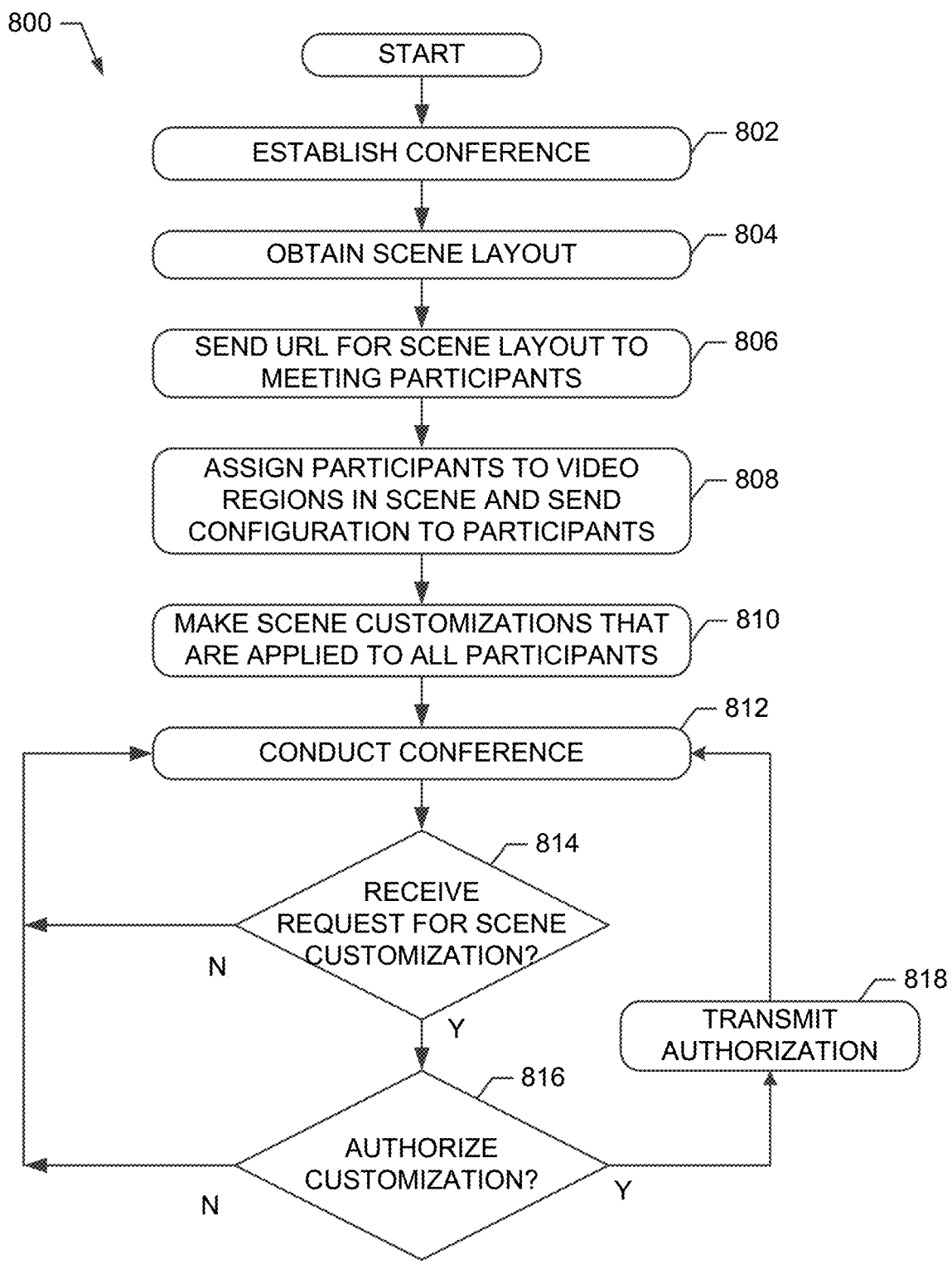
FIG. 8 shows an exemplary method for operating a host apparatus to provide a scene layout for use during a network conference.

FIG. 8 shows an exemplary method 800 for operating a host apparatus to provide a scene layout for use during a network conference. For example, in an embodiment, the method 800 is performed by the UE apparatus 102 shown in FIG. 1 or the host apparatus 500 shown in FIG. 5.

At block 802, a network connection is established between a host UE and one or more attendee UE. For example, as illustrated in FIG. 1, the host UE 102 and the attendee UE (A1-A3) participate in a network conference facilitated by the server 104 utilizing the communication network 106.

At block 804, a scene layout is obtained for use during the network conference. For example, the host apparatus 102 communicates with the server 104 to obtain the scene layout 110. In an embodiment, the scene layout is a pre-defined scene layout. In another embodiment, the scene layout is a custom layout generated by the host.

At block 806, a URL for the scene layout is sent to the meeting attendees. For example the host UE 102 transmits a scene URL 112 to the meeting attendees utilizing the communication network 106.

At block 808, the attendees are assigned to video regions within the scene. For example, the host UE 102 assigns one or more of the attendees to corresponding video regions with the scene layout 110. The host UE 102 transmits configuration parameters 530 to the attendees to distribute the assignments.

At block 810, customization to the scene layout are made by the host UE. For example, the host 102 modifies the scene layout by arranging the video regions, changing the scene background, or adding special effects to the scene. The host UE 102 transmits the configuration parameters 530 to the attendees to distribute the customizations.

At block 812, the conference is conducted between the host and the attendees utilizing the scene layout.

At block 814, a determinate made as to whether the host has received a request for customization to the scene layout by any of the attendees. For example, an attendee can request to make changes to the video region associated with the attended. If a request has not been received, the method precedes to block 812. If a request has been received, the method proceeds to block 816.

At block 816, a determination is made as to whether the request for scene layout customization by the attendee is approved. For example, the host UE 102 determines whether or not to approve the request based on user input 522. If the customization is not approved, the method proceeds to block 812. If the customization is approved, the method proceeds to block 818.

At block 818, authorization to adjust the scene is transmitted to the requesting attendee. The host UE 102 transmits the configuration parameters 530 to the attendee to authorize the customization.

Thus, the method 800 provides a method for operating a host apparatus to provide a scene layout for use during a network conference. In an embodiment, the method includes identifying a conference host and conference attendees from the conference participants, identifying a scene layout selected by the conference host, and distributing the scene layout to the conference participants. The scene layout includes a plurality of video areas. The method also includes assigning selected video areas of the scene layout to selected conference participants, respectively, receiving video streams from the selected conference participants, and displaying the scene layout so that the video streams from the selected conference participants are displayed in their associated video areas, respectively. It should be noted that the operations of the method 800 are exemplary and not limiting of the scope of the embodiments. Furthermore the operations of the method 800 can be changed, deleted, rearranged, added to, or otherwise modified within the scope of the embodiments.

Figure 9:
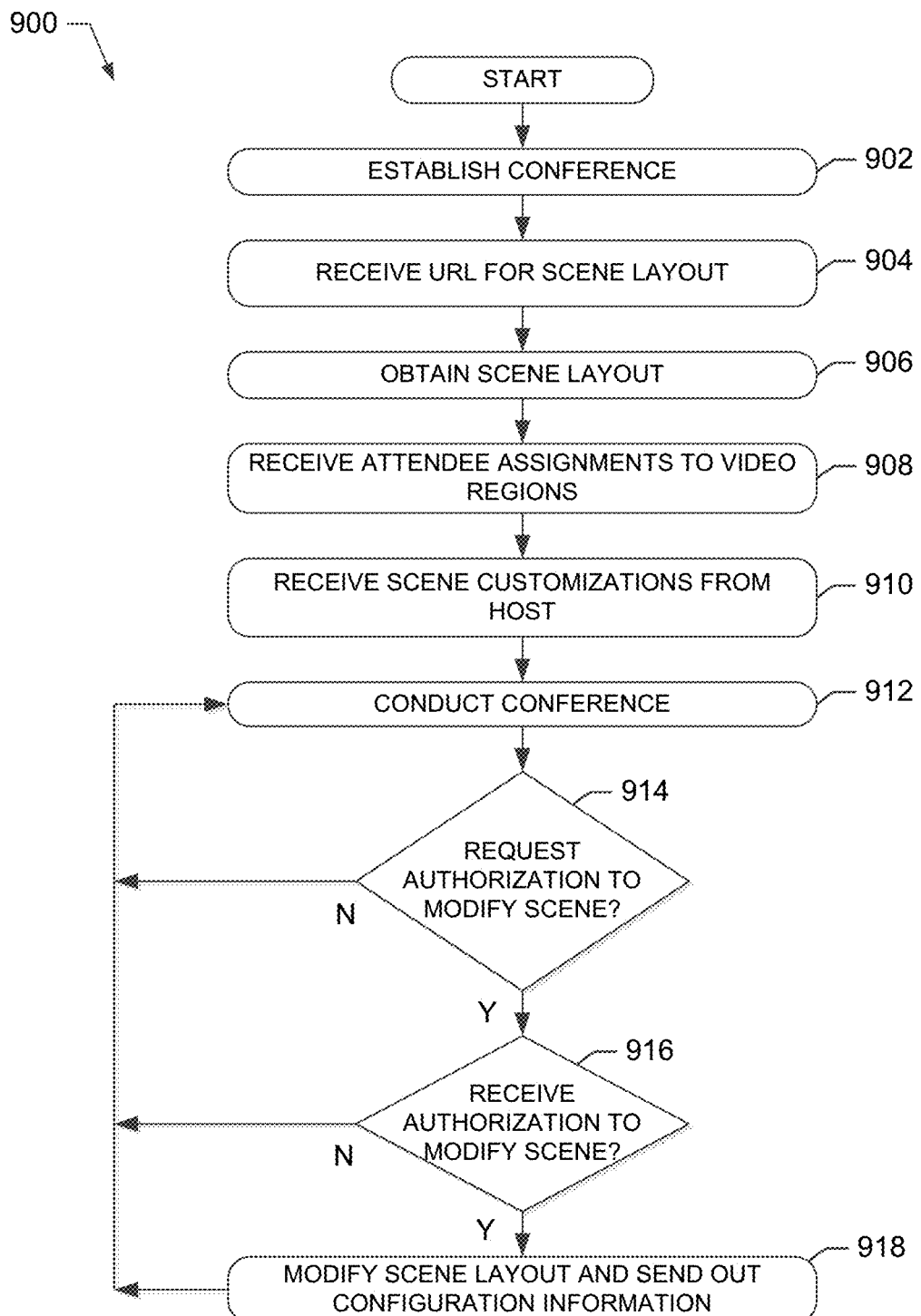
FIG. 9 shows an exemplary method for operating a UE of a conference attendee to utilize a scene layout during a network conference.

FIG. 9 shows an exemplary method 900 for operating a UE of a conference attendee to utilize a scene layout during a network conference. For example, in an embodiment, the method 900 is performed by any of the attendee UE (A1-A3) shown in FIG. 1 or by the attendee apparatus 600 shown in FIG. 6.

At block 902, a network connection is established between a host UE and one or more attendee UE. For example, as illustrated in FIG. 1, the host UE 102 and the attendee UE (A1-A3) participate in a network conference facilitated by the server 104 utilizing the communication network 106.

At block 904, URL for a scene layout is received at the attendee UE. For example, the host UE 102 transmits a scene URL 112 to the attendee UE (A1-A3) utilizing the communication network 106.

At block 906, the attendee UE utilize the URL to obtain the scene layout.

At block 908, the attendee UE receives assignment to the video regions of the scene layout. For example, each of the attendee UE is assigned to a particular video region within the scene layout. The assignments are received as part of the configuration parameters 626.

At block 910, the attendee UE receives customizations to the scene layout made by the host. For example, the host UE 102 makes customizations to the scene layout and propagates these customizations to each attendee UE. The customizations are received as part of the configuration parameters 626.

At block 912, the conference is conducted between the host UE and the attendee UE utilizing the scene layout. During the conference, the video streams received by the attendee UE are displayed in the assigned video regions of the scene based on the video identifiers and the configuration parameters 626 received from the host UE.

At block 914, a determination is made as to whether an attendee UE request to modify the scene layout. For example, an attendee UE may send a request 628 to the host to receive authorization to change the scene layout. If there are no requests, the method proceeds to block 912. If there is a request, the method proceeds to block 916.

At block 916, a determination is receive that indicates whether the request for scene customization by the attendee is approved by the host UE. For example the host UE 102 determines whether or not to approve the request for scene modification by the attendee. If the customization is not approved, the method proceeds to block 912. If the customization is approved, an authorization 630 is received and the method precedes to block 918.

At block 918, authorization to modify the scene is received from the host UE. The attendee is allowed to modify its own video characteristics in the scene layout. The attendee then sends out configuration information 626 to propagate the scene changes to other participants of the conference.

Thus, the method 900 provides a method for operating a UE of a conference attendee to utilize a scene layout during a network conference. It should be noted that the operations of the method 900 are exemplary and not limiting of the scope of the embodiments. Furthermore the operations of the method 900 can be changed, deleted, rearranged, added to, or otherwise modified within the scope of the embodiments.

Figure 10:
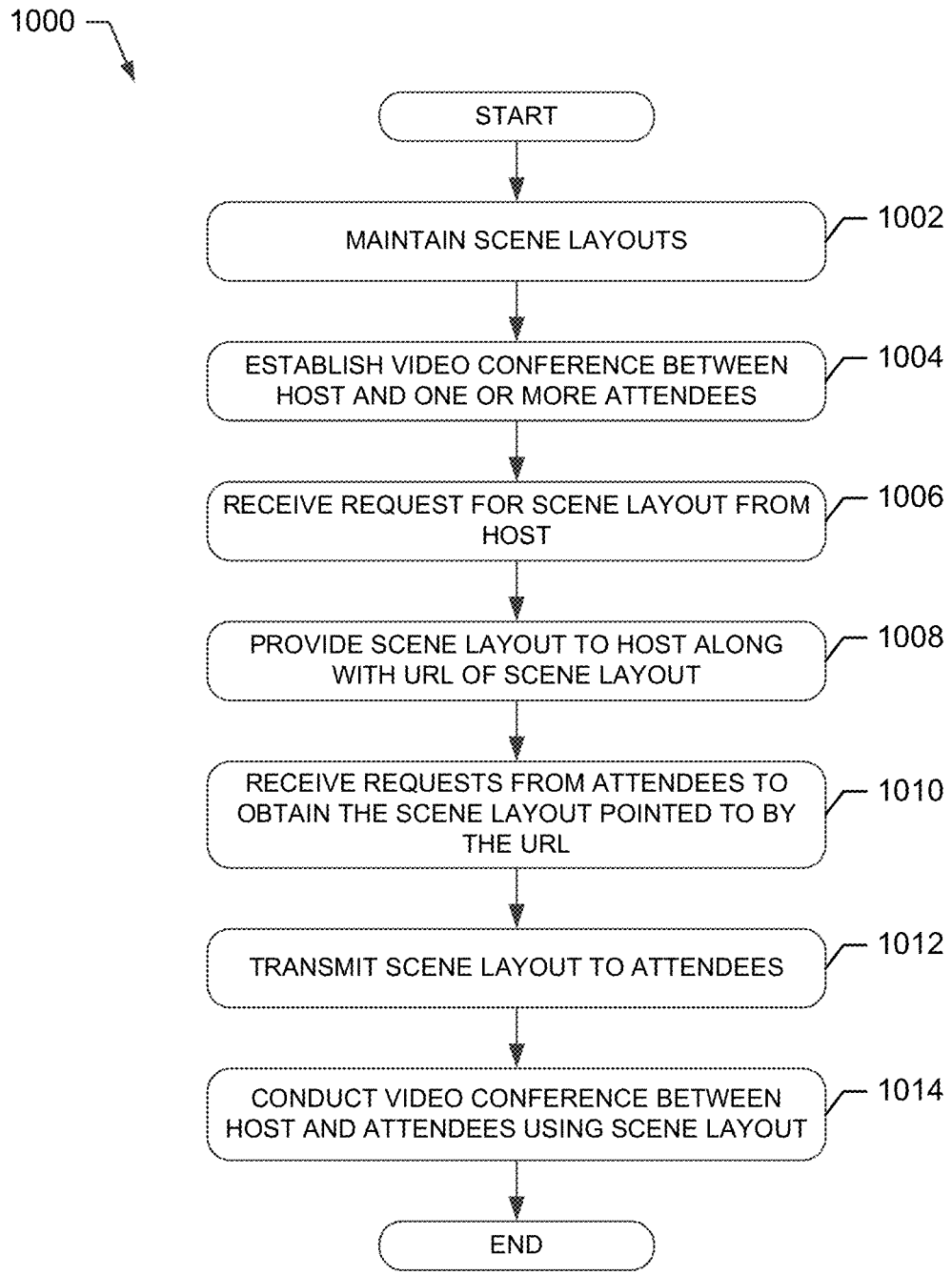
FIG. 10 shows an exemplary method for operating a server apparatus to provide a scene layout for use during a network conference.

FIG. 10 shows an exemplary method 1000 for operating a network server to provide a scene layout for use during a network conference. For example, the method 1000 is performed by the conference server 104 shown in FIG. 1 or the server apparatus 700 shown in FIG. 7.

At block 1002, scene layouts are maintained in a database. For example, the conference server 700 maintains a number of pre-defined scene layouts 710 that can be used by a host in during video conference. The server also maintains custom scene layouts provided by a conference host.

At block 1004, a video conference between a host and a plurality of attendees is established. For example, the server 104 facilitates a video conference between the host UE 102 and the attendee UE (A1-A3) utilizing the communication network 106.

At block 1006, a request for a scene layout is received from a host of a video conference. For example, the host UE 102 request a scene layout from the conference server 104.

At block 1008, the requested scene layout is provided to the host from the conference server. The conference server 104 obtains the scene layout from the stored layouts and transmits the scene layout 110 to the host UE, as indicated by the signal path 112. The transmitted scene layout also include a URL that identifies a location of the scene layout.

At block 1010, requests to access that URL are received from conference participants. For example, the conference participants b133 utilize the URL they receive from the host to access the scene layout from the conference server 104.

At block 1012, the network server receives requests for the scene layout from the conference attendees. For example, the conference attendees utilize the URL to access the scene layout. The network server transmits the scene layout in response to the requests from the attendees.

At block 1014, the video conference is conducted between the host UE and the attendee UE utilizing the scene layout.

Thus, the method 1000 provides a method for operating a network server to provide a scene layout for use during a network conference. It should be noted that the operations of the method 1000 are exemplary and not limiting of the scope of the embodiments. Furthermore the operations of the method 1000 can be changed, deleted, rearranged, added to, or otherwise modified within the scope of the embodiments.

Figure 11:
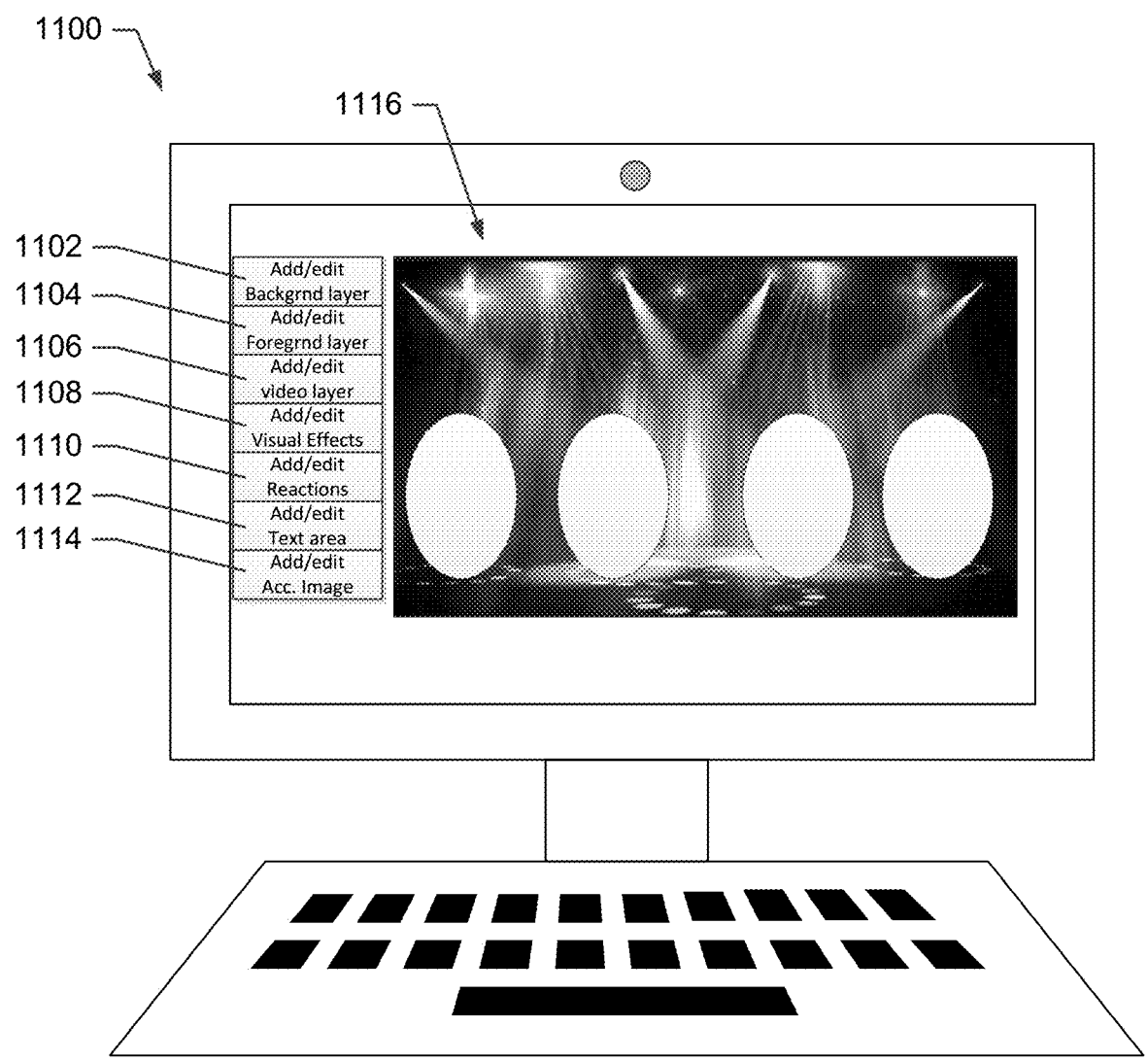
FIG. 11 shows an exemplary scene layout editor configured to generate customizable scene layouts.

FIG. 11 shows an exemplary scene layout editor 1100 configured to generate customizable scene layouts. In an embodiment, the scene layout editor 1100 can be implemented on a host apparatus, such as the host UE 102, or a network server, such as the network server 104, to create customizable scene layouts.

In an embodiment, the scene layout editor 1100 is used to create a customizable scene 1116. During operation, a background layer function 1102 can be used to add or edit background layers. A foreground layer function 1104 can be used to add or edit foreground layers. A video layer function 1106 can be used to add or edit video layers. The scene layout editor also comprises a reactions function 1110 that can be used to add or edit scene reactions. A text function 1112 can be used to add or edit a scene text area. An accessory image function 1114 can be used to add or edit accessory images. Therefore, in various exemplary embodiments, the scene layout editor 1100 can be used to create and edit a variety of customizable scene layouts for use during network conferences.

Figure 12:
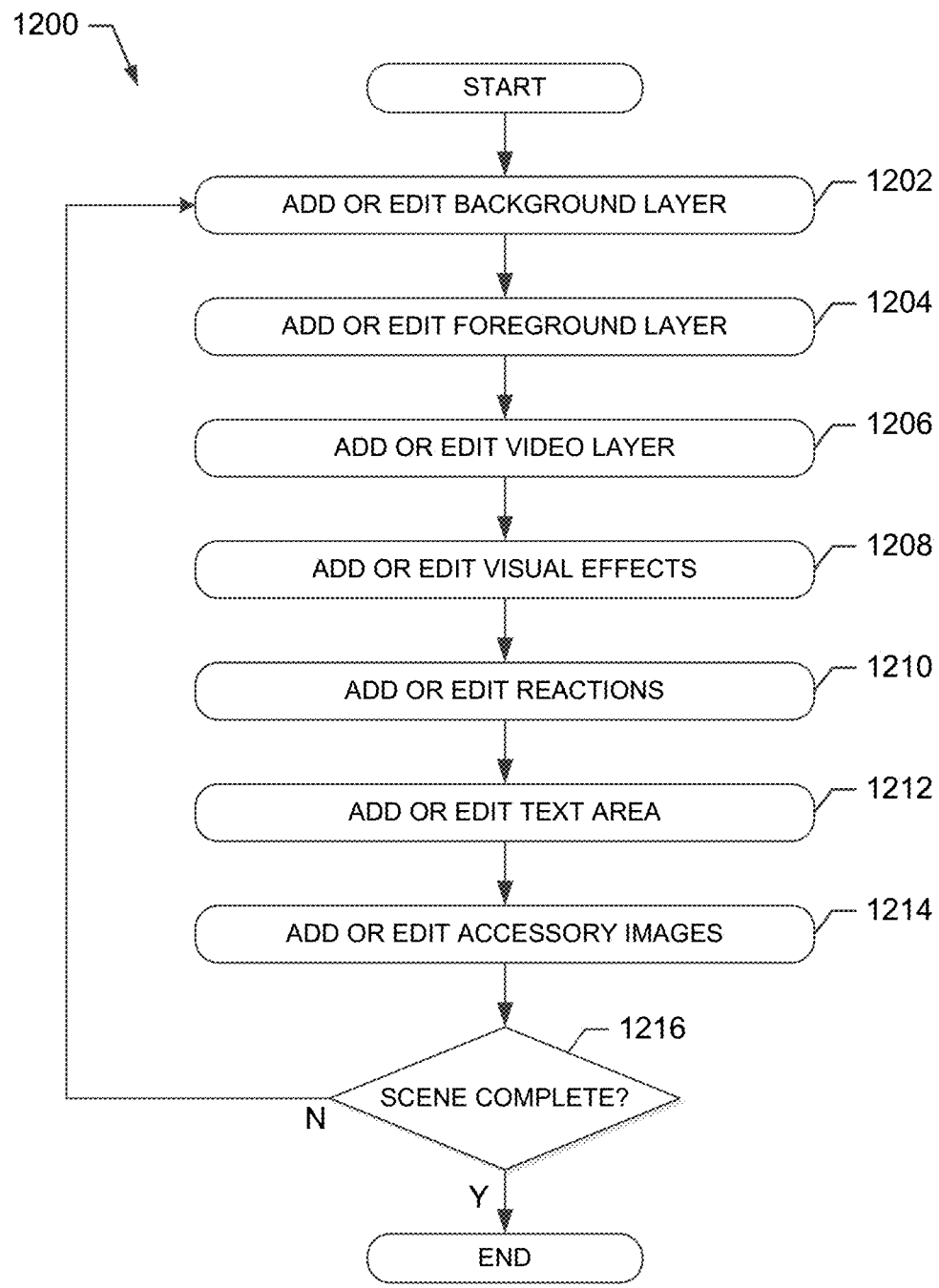
FIG. 12 shows an exemplary method for generating customizable scene layouts.

FIG. 12 shows an exemplary method 1200 for generating customizable scene layouts. For example, the method 1200 is performed by the scene layout editor 1100 shown in FIG. 11.

At block 1202, a scene background layer is added or edited within the scene layout. It should be noted that the scene layout may comprise a plurality of background layers that can be individually edited.

At block 1204, a scene foreground layer is added or edited within the scene layout. It should be noted that the scene layout may comprise a plurality of foreground layers that can be individually edited.

At block 1206, a scene video layer is added or edited within the scene layout. It should be noted that the scene layout may comprise of plurality of video layers that can be individually edited.

At block 1208, visual effects are added or edited within the scene layout.

At block 1210, reactions are added or edited in the scene layout.

At block 1212, text areas are added or edited within the scene layout.

At block 1214, accessories images are added or edited within the scene layout.

At block 1216, a determination is made as to whether the scene layout is complete. If scene layout is not complete the method proceeds to block 1202. If the scene layout is complete the method ends.

Thus, the method 1200 operates to generate customizable scene layouts. In an embodiment, the method is performed by the scene layout editor 1100. It should be noted that the operations of the method 1200 are exemplary and not limiting of the scope of the embodiments. Furthermore the operations of the method 1200 can be changed, deleted, rearranged, added to, or otherwise modified within the scope of the embodiments.

Figure 13:
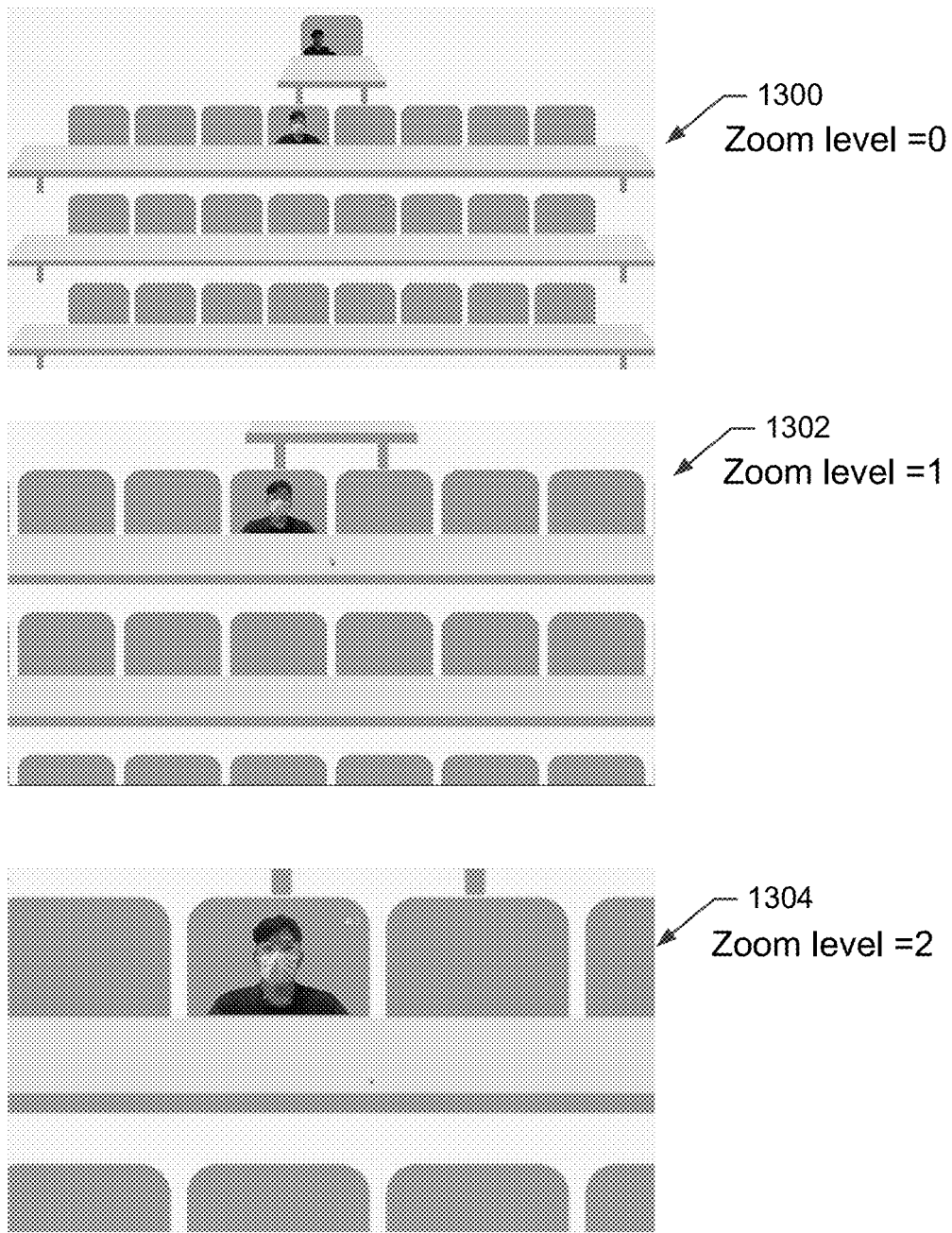
FIG. 13 shows exemplary scene zoom levels that a host can apply to a scene layout.

FIG. 13 shows exemplary scene zoom levels that a host can apply to a scene layout. For example, during a network conference, the host UE can perform a zoom function to change the zoom level of the scene layout as it is displayed. For example, the scene 1300 has no zoom applied, the scene 1302 has zoom level 1 applied, and the scene 1304 has zoom level 2 applied. In an embodiment, the zoom level can be propagated to conference attendees through the configuration parameters 530.

In an embodiment, the exemplary embodiments described herein are implemented using customized hard-wired logic, one or more ASICs or FPGAs, firmware and/or program logic which in combination with a computer system causes or programs the disclosed apparatus to be a special-purpose machine. According to one embodiment, the operations described herein are performed by a processor or computer executing one or more sequences of one or more instructions contained in memory. Such instructions may be read into memory from another storage medium. Execution of the sequences of instructions contained in memory causes a processor to perform the process steps described herein. In alternative embodiments, hard-wired circuitry may be used in place of or in combination with software instructions.

The term "storage media" as used herein refers to any non-transitory medium that stores data and/or instructions that cause a machine to operate in a specific fashion. Such storage media may comprise non-volatile media and/or volatile media. Non-volatile media includes, for example, optical or magnetic disks, such as memory 404 or instructions memory 412. Volatile media includes dynamic memory. Common forms of storage media include, for example, a floppy disk, a flexible disk, a hard disk, a solid state drive, a magnetic tape, or any other magnetic data storage medium, a CD-ROM, any other optical data storage medium, any physical medium with patterns of holes, a RAM, a PROM, and an EPROM, a FLASH-EPROM, an NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise one or more buses. Transmission media can also take the form of acoustic or light waves, such as those generated during radio-wave and infra-red data communications.

Various forms of media may be involved in carrying one or more sequences of one or more instructions to a disclosed processor for execution. For example, the instructions may initially be carried on a magnetic disk or a solid-state drive of a remote computer. The remote computer can load the instructions into its dynamic memory and send the instructions over a telephone line using a modem. A local modem can receive the data on the telephone line and use an infra-red transmitter to convert the data to an infra-red signal. An infra-red detector can receive the data carried in the infra-red signal and appropriate circuitry can place the data on a data bus, which carries the data to a memory, from which a processor retrieves and executes the instructions. The instructions may optionally be stored on a storage device either before or after execution by processor.

The exemplary embodiment of the present invention includes various processing steps described herein. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

While particular embodiments of the present invention have been shown and described, it will be obvious to those of ordinary skills in the art that based upon the teachings herein, changes and modifications may be made without departing from this exemplary embodiments of the present invention and its broader aspects. Therefore, the appended claims are intended to encompass within their scope all such changes and modifications as are within the true spirit and scope of this exemplary embodiments of the present invention.

That which is claimed is:

1. A method for conducting a conference between conference participants, the method comprising:
   obtaining a scene layout for the conference, the scene layout comprising a background layer and at least one video layer, a plurality of video areas that are each assigned to a respective one of the at least one video layers and to display a video stream from one of the conference participants, and the scene layout forming a common visual presentation for the conference;
   receiving and assigning one or more images to the background layer;
   receiving video streams from one or more of the conference participants;
   constructing the scene layout based on the background layer and the at least one video layer; and
   displaying the scene layout, wherein the video streams from the conference participants are displayed in their respective assigned video areas.

2. The method of claim 1, wherein obtaining the scene layout comprises:
   receiving a universal resource locator ("URL"); and
   accessing the URL to retrieve the scene layout.

3. The method of claim 1, further comprising:
   receiving configuration parameters to modify the scene layout; and
   displaying the modified scene layout, wherein the video streams from the conference participants are displayed according to the modified scene layout.

4. The method of claim 1, further comprising:
   transmitting a request to modify the scene layout to a conference host;
   receiving authorization to modify the scene layout; and
   providing configuration parameters to the conference host.

5. The method of claim 4, wherein the configuration parameters modify one or more of a size, a shape, a location, an orientation, a background associated with an assigned video area, or an assignment of a video stream to a video area.

6. The method of claim 1, wherein the scene layout comprises one or more video effects, reactions, accessories images, text areas, or accessory selectors.

7. The method of claim 1, further comprising:
   generating configuration parameters to modify the scene layout; and
   providing the configuration parameters to the conference participants.

8. The method of claim 1, further comprising:
   receiving a request to modify the scene layout from a client device associated with a conference participant;
   approving the request;
   receiving configuration parameters from the client device; and
   providing the configuration parameters to the conference participants.

9. A system comprising:
a communications interface;
a non-transitory computer-readable medium; and
one or more processor communicatively coupled to the communications interface and the non-transitory computer-readable medium, the one or more processors configured to execute processor-executable instructions stored in the non-transitory computer-readable medium to:
   obtain a scene layout for a conference between conference participants, the scene layout comprising a background layer and at least one video layer, a plurality of video areas that are each assigned to a respective one of the at least one video layers and to display a video stream from one of the conference participants, and the scene layout forming a common visual presentation for the conference;
   receive and assign one or more images to the background layer;
   receive video streams from one or more of the conference participants;
   constructing the scene layout based on the background layer and the at least one video layer; and
   display the scene layout, wherein the video streams from the conference participants are displayed in their respective assigned video areas.

10. The system of claim 9, wherein the one or more processors are configured to execute further processor-executable instructions stored in the non-transitory computer-readable medium to:
   receive a universal resource locator ("URL"); and
   access the URL to retrieve the scene layout.

11. The system of claim 9, wherein the one or more processors are configured to execute further processor-executable instructions stored in the non-transitory computer-readable medium to:
   receive configuration parameters to modify the scene layout; and
   display the modified scene layout, wherein the video streams from the conference participants are displayed according to the modified scene layout.

12. The system of claim 9, wherein the one or more processors are configured to execute further processor-executable instructions stored in the non-transitory computer-readable medium to:
   transmit a request to modify the scene layout to a conference host;
   receive authorization to modify the scene layout; and
   provide configuration parameters to the conference host.

13. The system of claim 12, wherein the configuration parameters modify one or more of a size, a shape, a location, an orientation, a background associated with an assigned video area, or an assignment of a video stream to a video area.

14. The system of claim 9, wherein the scene layout comprises one or more video effects, reactions, accessories images, text areas, or accessory selectors.

15. A non-transitory computer-readable medium comprising processor-executable instructions configured to cause one or more processors to:
   obtain a scene layout for a conference between conference participants, the scene layout comprising a background layer and at least one video layer, a plurality of video areas that are each assigned to a respective one of the at least one video layers and to display a video stream from one of the conference participants, and the scene layout forming a common visual presentation for the conference;
   receive and assign one or more images to the background layer;
   receive video streams from one or more of the conference participants;
   constructing the scene layout based on the background layer and the at least one video layer; and
   display the scene layout, wherein the video streams from the conference participants are displayed in their respective assigned video area.

16. The non-transitory computer-readable medium of claim 15, further comprising processor-executable instructions configured to cause one or more processors to:
   receive a universal resource locator ("URL"); and
   access the URL to retrieve the scene layout.

17. The non-transitory computer-readable medium of claim 15, comprising processor-executable instructions configured to cause one or more processors to:
   receive configuration parameters to modify the scene layout; and
   display the modified scene layout, wherein the video streams from the conference participants are displayed according to the modified scene layout.

18. The non-transitory computer-readable medium of claim 15, comprising processor-executable instructions configured to cause one or more processors to:
   generate configuration parameters to modify the scene layout; and
   provide the configuration parameters to the conference participants.

19. The non-transitory computer-readable medium of claim 15, comprising processor-executable instructions configured to cause one or more processors to:
   receive a request to modify the scene layout from a client device associated with a conference participant;
   approve the request;
   receive configuration parameters from the client device; and
   provide the configuration parameters to the conference participants.

20. The non-transitory computer-readable medium of claim 15, comprising processor-executable instructions configured to cause one or more processors to select the scene layout from a plurality of scene layouts available at a conference server.

* * * * *